Feb. 10, 1925.

G. C. KENNEDY 1,525,746

ILLUSION PRODUCING DEVICE

Filed July 1, 1921    3 Sheets—Sheet 1

Inventor,
G. C. Kennedy.

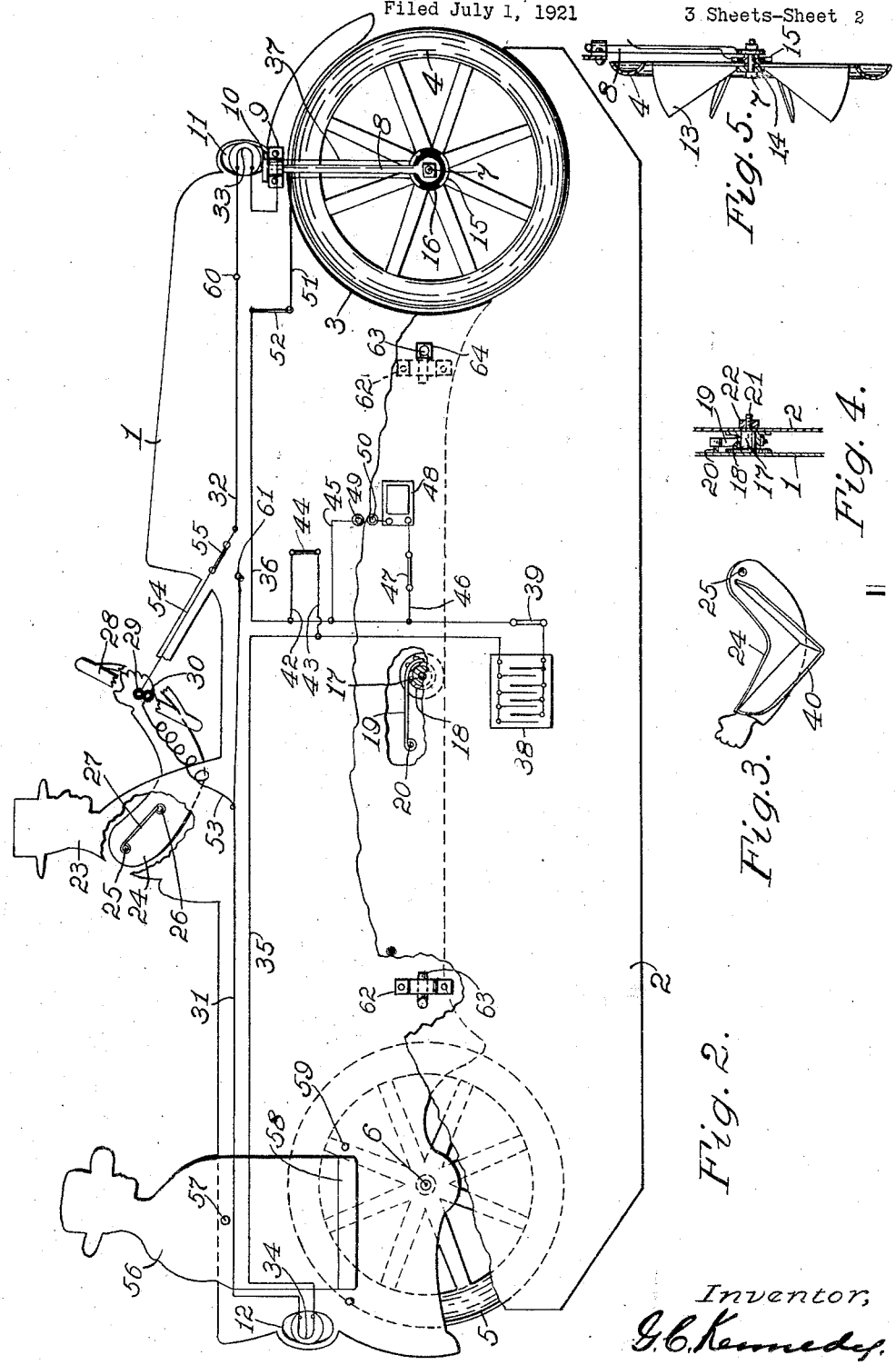

Feb. 10, 1925.

G. C. KENNEDY 1,525,746

ILLUSION PRODUCING DEVICE

Filed July 1, 1921

3 Sheets-Sheet 3

Inventor.
G. C. Kennedy.

Patented Feb. 10, 1925.

1,525,746

UNITED STATES PATENT OFFICE.

GEORGE COLVIN KENNEDY, OF WATERLOO, IOWA.

ILLUSION-PRODUCING DEVICE.

Application filed July 1, 1921. Serial No. 481,937.

*To all whom it may concern:*

Be it known that I, GEORGE COLVIN KENNEDY, a citizen of the United States of America, and a resident of Waterloo, Blackhawk County, Iowa, have invented certain new and useful Improvements in Illusion-Producing Devices, of which the following is a specification.

My invention relates to improvements in illusion-producing devices, and the object of my improvement is to provide a sign or other device with means adapted to give it an illusive appearance of translatory movement, said means including visible and audible signaling devices, for attracting attention thereto.

Figure 1:
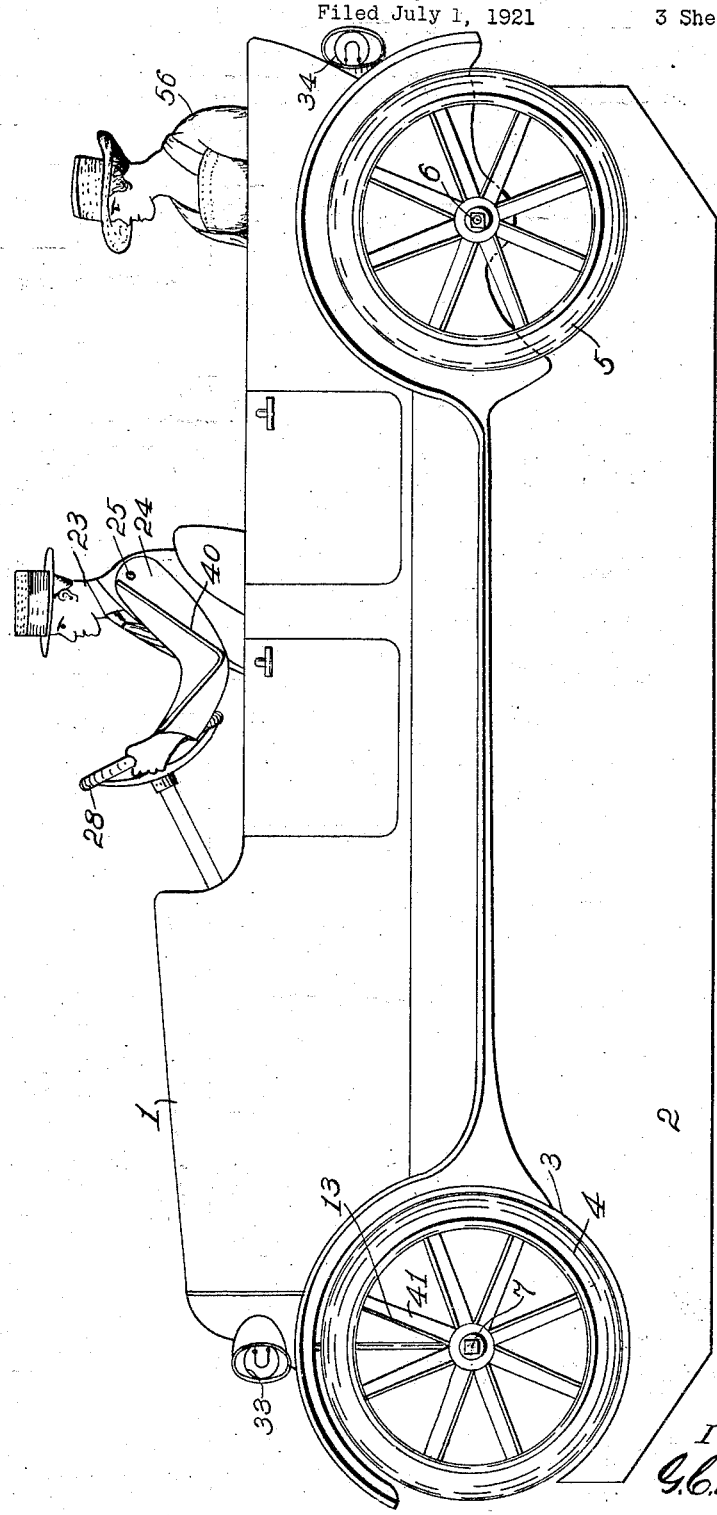
Figure 6:
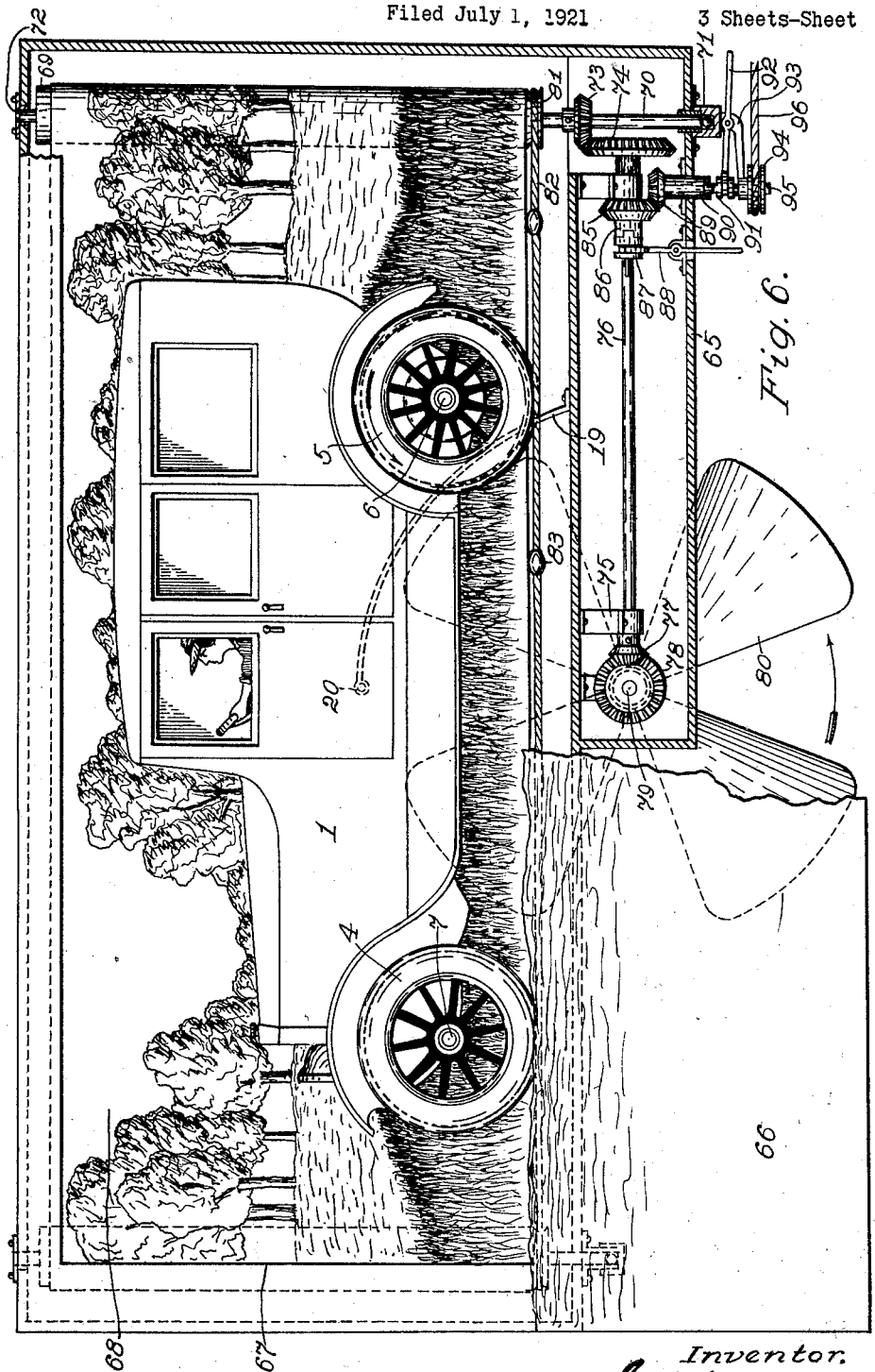

This object has been accomplished by the means which are hereinafter described and claimed, and which are illustrated in the accompanying drawings, in which Fig. 1 is a front elevation of my improved device; Fig. 2 is a rear elevation thereof, with parts broken away; Fig. 3 is a detail perspective view of a rocking part of the device; Fig. 4 is a fragmental sectional view showing the spring-controlled pivotal connection between the fixed back-plate and the rocking front-plate, and Fig. 5 is a central vertical cross section of the vane-bearing wheels of the device. Fig. 6 is an elevation of a modified sign, showing parts broken away.

Similar numerals of reference denote corresponding parts throughout the several views.

The principle exemplified in this device is that of producing a visual illusion of translatory movements in a relatively fixed device due to certain other movements in the device or parts thereof with or without the additional provision of visible or audible signals. The device or object producing this illusion may be of any kind or appearance representative of a vehicle or other translatory body, but for purposes of illustration, I have given a representation of a passenger automobile, without intending to restrict myself in any way by this embodiment.

The numeral 1 denotes the body part of such an automobile as formed or stamped from a plate of metal or other material, including a projection 23 representing a figure, such as a chauffeur.

The numeral 2 denotes a back-plate or relatively fixed supporting element which may also be formed from a flat sheet of metal or other material. The front-plate 1 may, if desired, be either fixedly or movably mounted on the plate 2, but is preferably medially pivoted thereon for rocking movements.

Referring to Figs. 2 and 4, the numeral 18 denotes a bearing socket fixed on the front face of the plate 2 in line with an orifice therein. A pin or stub-shaft 17 is fixed on the rear face of the plate 1 and is mounted to rock in the bearing 18, and has a diminished and threaded extension 21 passed through the said orifice in said plate and secured thereto by a nut 22. A bar-spring 19 has one end fixed to the bearing 18 and its other end is secured to a fixed pin 20 on the rear face of the plate 1, said spring serving to resiliently restrict rocking movements of the plate 1 while normally keeping the latter in the horizontal position shown. The projecting figure 23 has a forwardly extending pintle 25 on which is fixed one end of a bar-spring 27, and on which an arm 24 is mounted to swing thereon. The other end of said spring is secured to a pin 26 projecting from the arm 24, said spring serving to restrict the vertical oscillations of the arm while normally maintaining it in its extended horizontal position. The free end of the arm 24 is adapted to oscillate up and down over and in front of a projection 28 of the plate 1 which represents a steering-wheel.

The numeral 56 denotes a figure formed from a plate, which is pivotally suspended on a pin 57 extending rearwardly from the plate 1, the plate 56 having a weight 58 fixed on its lower end whose gravity serves to normally maintain it in a vertically directed position. However, this result may be attained by making the lower part of the plate 56 of somewhat larger area than the part thereof above the pin 57.

The arm 24 has an angular rib 40 fixed along its outer face. One end of said plate 1 is cut out circularly at 3 concentrically with a wheel 4 positioned therein. This wheel may be made, as shown in Fig. 1, to represent an automobile wheel of the steerable kind having an outwardly convexed tire part pressed out from the plate, and having spokes 41. In the operation of forming the spokes, partially cut out portions 13 are bent forwardly angularly to present edges to the front and to serve as wind-vanes. The wheel 4 has a central tubular part 14 rotatable on a pintle-bolt 7 which is passed through an orifice in the lower end of a vertical rock-shaft 8. The upper part of the shaft 8 is mounted to rock in a bearing 9 fixed on the plate 1 above said wheel, and has a T-head whose branches 10 serve as means for limiting the extent of rocking movements of said shaft and said wheel 4, by impinging against the back of the plate 1. On the tubular part 14 is fixedly mounted an insulating-ring 16 having separated rim-segments 15 of conducting material embedded therein circumferentially.

A wheel 5, of like construction to that of the said wheel 4, is rotatably mounted on a pintle 6 on the front face of the opposite end of said plate 1.

Openings 11 and 12 of elliptical shape may be provided in the ends of the plate 1. Back of these openings incandescent lamps 33 and 34 may be positioned, of small candle-power.

A source of electrical current, such as a storage-cell 38 may be provided in circuit with a loop containing the lamps 33 and 34 and an audible signaling-device, such as the buzzer 48.

The said loop may contain a master circuit-breaker 39, while both the cell 38 and the buzzer 48 may be mounted on the rear of said plate 2. The loop comprises the conductors 31—32 and 35—36 with said lamps. The buzzer 48 is adapted for inclusion in said loop disconnectedly by a series loop 45—46 containing a circuit-breaker 47, and also containing another circuit-breaker comprising insulated contacts 49 and 50 mounted respectively on said plates 1 and 2 for occasional rubbing contacts when the plate 1 rocks to and fro.

A short loop 42—43 containing a circuit-breaker 44 connects the conductors 35 and 36 beyond the buzzer 48 so that when the circuit-breaker is open, the lamps may be in circuit with the cell 38 but when the circuit-breaker is closed, the lamps are cut off and only the buzzer operated while the plate 1 is in position to close the circuit 31 at the contacts 49 and 50. The intermittent sound of the buzzer so occasioned, simulates noises of a moving vehicle illusively, and as an audible signal, also draws attention to the device. Instead of a buzzer, a bell signal may be substituted if desired.

The lamp 11 may be disconnected from the main loop 32—36 by a circuit-breaker 52, and the circuit may be reestablished by bringing said circuit-breaker into contact with a terminal of a conductor 51, another conductor 37 leading from said lamp for occasional closing of circuit with the conductor 51 by means of the circuit-breaker 13—16 on the hub of the wheel 4 with which terminals of said conductors have rubbing contact as the wheel rotates.

The making and breaking of the main circuit thus obtained intermittently flashes both lamps 11 and 12 creating the illusion of momentarily illumination and obscurancy of lamps on a vehicle when the latter is in translation and under vibration. An auxiliary circuit-breaker for the circuit through said lamps and said buzzer is provided in the rubbing contacts insulatedly mounted at 29 and 30 respectively on the hand-wheel part 28 and on the abutting arm 24. This part of the circuit is closed by way of the conductors 54 and 53, the conductor 54 containing a circuit-breaker 55 which may also be used to close contact with a terminal 61 to cut off the circuit-breaker 29—30.

It is obvious that with the said wiring, the employment of the buzzer and of the lamps may be separate or together, and that either mode of intermittently operating the lamps may be used separately.

The numeral 62 denotes a pair of loops fixed on the back of the plate 1 near its opposite ends to receive the inturned ends of hook-bolts 63 which are removably mounted in bolt-holes in the plate 2 and secured by nuts 64 on the back of the latter plate. These connected elements allow limited up and down play of the plate 1, and also support the plate to prevent wind-pressure bending or displacing the ends of the plate forwardly from the plate 2.

Air-currents, even of very light pressure, will rotate the wheels 4 and 5 by impinging upon the vanes 41, and will also rock the arm 24 by pushing upon the vane 40, while these pressures will rock the plate 1, thus conjointly and associatively moving said parts which produces an ocular illusion of a longitudinal translatory movement of the plate 1.

The intermittent flashing of the lamps, and sounding of said buzzer, adds to the effect of the ocular illusion, in the representation of a vehicle in rapid progression. The illuminating means may be cut off by the circuit-breakers provided.

In Fig. 6 is shown a modified device. 65 is a casing or housing, open at the front, having bearings 71 at the bottom and 72 at the top to receive the ends of vertical spaced rotatable spindles 70 on which rollers 69 are mounted rigidly, said rollers carrying an endless apron or background screen 68. A foreground screen 66 may be secured over the open front of the housing 65, having a large opening 67 over the background screen, and having its lower part depending below the housing. Fixed on said spindles at the lower ends of said rollers are pulley-grooves 81 carrying a cord belt 82 on which are mounted at considerable intervals beads or enlargements 83.

Mechanism is mounted in said housing for rotating said rollers 69 to translate the endless screen 68 in one direction. A bevel-gear wheel 73 is mounted on a shaft 70 which carries one of said rollers 69, and is meshed with a bevel-gear 74 on a sleeve 86 loose but non-slidably mounted on one end of a horizontal shaft 76 which is rotatably mounted in hanger-bearings 75.

A gear-wheel 85 is rigidly mounted on said sleeve and is in mesh with a bevel-pinion 89 loosely and non-slidably mounted on a short vertical shaft 95, being rigid with a sleeve 90 whose lower end is provided with a clutch-end adapted for releasable engagement with a mating clutch-end on an annularly-grooved sleeve 91 which is slidably non-rotatably mounted on the shaft 95, the forked end of a shifting-lever 92 being seated in the annular groove of said sleeve 91, the lever being medially pivoted on a bracket 93 which extends from the lower end of the step-bearing 71. The lower part of said shaft 95 is rotatable in a bearing on the end of said bracket 93, and below said bearing a grooved pulley 94 is fixed on said shaft 95, and carries a cord belt 96 driven by any suitable motor.

I have provided an alternative driving-means, operable by wind-power, when the latter is available, to save motor expense. An annularly grooved sleeve 87 is slidably non-rotatably mounted on the shaft 76 and has a clutch-end adapted to be engaged with the clutch-end on said sleeve 86, the sleeve 87 being shifted to and fro by the forked end of a lever 88 which is medially pivoted on a pintle supported on the housing. On the opposite end of the shaft 76 is fixed a bevel-pinion 77 in mesh with a bevel-gear 78 on one end of a shaft 79, the latter rotatably mounted in a hanger-bearing, and carrying on its rear end a set of wind-vanes 80 outside the housing, which are moved by air-currents.

My invention is not confined to a sign, but may be employed for purposes of visual illusion in representing any object or device having as a whole or with its parts self movement or naturally related and associated movements such as occur appropriately under any impulse or propulsion.

My device may thus be used either without or within a building, and it is obvious that in either installation other modifications are covered by the principles of the invention and by the appended claims.

Having described my invention, what I claim as new, and desire to secure by Letters Patent, is:

1. An illusion-producing object, comprising a device made to imitate a translatable body, means for supporting it for oscillation and an oscillatory member mounted thereon for primary actuation by an air current and when in oscillation producing a secondary oscillation of said main body.

2. An illusion-producing object, comprising supporting means, a main imitatively pictured oscillatory body mounted thereon, an elastic connection between said body and said supporting means for yieldingly retaining it in one position, and a projecting element on said body adapted to receive propulsive force from an air current whereby said body is oscillated varyingly.

3. An illusion-producing object, comprising a main body representing a translatable device suspended pivotally above its own center of gravity, and a member suspended pivotally above its center of gravity on said main body and representing a movable part of said device, said member having engaging-means for propulsive actuation by an air current to cause movements both of itself and of said main body to create a visual illusion of translation of the main body.

4. An illusion-producing object, comprising a main body supported for relative movements and having the appearance of a propellable device, and a member mounted rotatably thereon having engaging-means for imparting rotation to it when in the path of an air current, whereby the air-push on said member will impart induced movements of said main body.

5. An illusion-producing object, comprising a main body visually representing a translatory device supported for oscillation, a projection thereon extending angularly into the path of movement of an air current, whereby said main body is oscillated, and a member suspended pivotally on said main body and oscillated by and when the main body is oscillated.

6. An illusion-producing object, comprising a main body mounted for oscillation and visually imitating the appearance of a translatable object, and a resiliently-controlled member mounted for oscillation on said main body, both said main body and said member having engaging-means for a passing air current adapted to oscillate both the main body and said member.

7. An illusion-producing object, comprising a main body having the appearance of a translatable device mounted for oscillation, and a member having the appearance of a movable element of said device mounted on said main body for relative movements and having engaging means to extend into an air current whereby said member when acted propulsively upon by an air current induces oscillations of the main body.

8. An illusion-producing object, comprising a body supported for oscillation and shaped and pictured to represent a translatory object, an element supported for oscillation upon said body and also shaped and pictured to represent another object movably stationed thereon, and another element mounted movably upon said body and shaped and pictured to represent a propellable part thereof, said body when placed in oscillation causing such movements of said first-mentioned element as to create an illusion of translatory movement of the body as movably carrying said element.

9. An illusion-producing sign, comprising a body supported for oscillation and shaped and pictured to represent a translatory object, and shaped and pictured elements supported upon said body for movements related thereto when said body is oscillated, the oscillatory movements of said body creating the visual illusion of translatory movement thereof, and the related movements of said elements relative to said body and each other heightening the visual illusion of translatory movement of said body.

10. In combination, a body supported for oscillation and shaped and pictured to represent a self-movable object, and shaped and pictured elements movably supported thereon for relative self-movements when the said object and said elements are positively moved, the respective related movements thus induced in said body and said elements producing a visual illusion of related self movements of the things represented.

Signed at Waterloo, Iowa, this 28th day of May, 1921.

GEORGE COLVIN KENNEDY.